(12) United States Patent
Fredholm et al.

(10) Patent No.: US 6,182,472 B1
(45) Date of Patent: Feb. 6, 2001

(54) MANUFACTURE OF GLASS-CERAMIC PLATES HAVING OPENING(S) OF BENT PERIMETER, BENT GLASS-CERAMIC PLATES

(75) Inventors: Allan M. Fredholm, Avon; Claude Gille, Bougligny; Michel Grassi, La Ferte sous Jouarre; Pablo Vilato, Paris; Jean-Louis Viron, Grez sur Loing, all of (FR)

(73) Assignee: Eurokera, Chateau-Thierry (FR)

( * ) Notice: Under 35 U.S.C. 154(b), the term of this patent shall be extended for 0 days.

(21) Appl. No.: 09/293,697

(22) Filed: Apr. 16, 1999

(30) Foreign Application Priority Data

Apr. 16, 1998 (FR) .................................................. 98 04722

(51) Int. Cl.$^7$ ........................ C03B 23/031; C03B 32/02; C03C 10/12
(52) U.S. Cl. ................................ 65/33.8; 65/33.1; 65/64; 65/104; 65/106
(58) Field of Search .................................. 65/33.1, 33.8, 65/64, 104, 106

(56) References Cited

U.S. PATENT DOCUMENTS

| | | | |
|---|---|---|---|
| 3,531,272 | * | 9/1970 | Menear .................................. 65/33.8 |
| 3,681,043 | * | 8/1972 | Bognar .................................... 65/103 |
| 3,830,216 | * | 8/1974 | Dodd .................................... 126/39 J |
| 4,173,461 | | 11/1979 | Ebata et al. ............................. 65/106 |
| 4,184,864 | | 1/1980 | Reese ..................................... 65/285 |
| 5,549,100 | * | 8/1996 | Heisner et al. ....................... 126/39 J |
| 5,931,152 | * | 8/1999 | Fafet et al. ......................... 126/214 R |
| 5,968,219 | * | 10/1999 | Gille et al. ............................. 65/33.8 |
| 6,103,338 | * | 8/2000 | Gille et al. ............................. 428/325 |
| 6,120,282 | * | 9/2000 | Vilato et al. ............................... 431/1 |

FOREIGN PATENT DOCUMENTS

| | | |
|---|---|---|
| 33 45 859 A1 | 12/1983 | (DE) . |
| 0 570 669 A1 | 2/1993 | (DE) . |
| 2 710 729 | 9/1994 | (FR) . |
| 59-013639 | 1/1984 | (JP) . |
| 59-152232 | 8/1984 | (JP) . |
| 10339454 * | 12/1998 | (JP) . |

\* cited by examiner

Primary Examiner—Sean Vincent
(74) Attorney, Agent, or Firm—Milton M. Peterson; Angela N. Nwaneri

(57) ABSTRACT

The present invention relates to: a method of bending the perimeter of at least one opening (2) provided in a glass-ceramic precursor plate (1), said perimeter describing a closed curve without sharp angles; a method of manufacturing a glass-ceramic plate (10', 10") in which at least one opening (2) is provided, whose perimeter describing a closed curve without sharp angles is bent; novel glass-ceramic plates (10', 10"), obtainable by implementing said manufacturing methods.

14 Claims, 2 Drawing Sheets

MANUFACTURE OF GLASS-CERAMIC PLATES HAVING OPENING(S) OF BENT PERIMETER, BENT GLASS-CERAMIC PLATES

FIELD OF THE INVENTION

The present invention relates to a method of manufacturing glass-ceramic plates having opening(s) of bent perimeter; the invention also relates to novel, bent glass-ceramic plates obtainable by said method of manufacture.

More precisely, the invention provides:

a method of bending the perimeter of at least one opening provided in a glass-ceramic precursor plate, said perimeter describing a closed curve without sharp angles (without brittle angles);

a method of manufacturing a glass-ceramic plate in which at least one opening is provided whose perimeter describing a closed curve without sharp angles (without brittle angles) is bent; and novel glass-ceramic plates obtainable by implementing said manufacturing method.

BACKGROUND OF THE INVENTION

Sales of glass-ceramic hob plates have been expanding continuously for several years. This success can be explained in particular by the attractive appearance of such plates, and by the ease with which they can be cleaned.

Thus, large quantities of plane electric hob plates are made out of glass-ceramic. These plates are initially made out of a plate of glass that is a precursor for glass-ceramic, and then they are cerammed.

Such plane plates of glass-ceramic are also made for gas cookers or for combined hobs: in particular combined gas-and-electricity hobs. It is necessary to provide openings or holes through the thickness of that type of plate through which the atmospheric gas burners are passed. These openings are provided of a diameter that is sufficiently large relative to the diameter of the burners concerned to avoid force being used during assembly, and thus to avoid the risk of breaking the plate. Said diameter generally lies in the range 40 mm to 95 mm. Similarly, smaller openings may be provided in that type of plate, in particular for receiving control knobs.

These openings of large or small diameter are generally made through the glass-ceramic precursor plate, prior to implementing the ceramming cycle. The openings are generally made by milling or by being cut out by water jet.

The presence of such openings through which there pass metal parts (bottom portion of burner, support rod of control knob) gives rise in use to two types of problem:

a problem of sealing: the gap thus left between the plate and the through element can allow various dust and liquids to infiltrate beneath the plate, e.g. when a cooking utensil boils over. Apart from the fact that cleaning this type of installation is difficult and often requires at least a portion of the device to be disassembled, liquid penetrating beneath the plate can be dangerous, particularly when there are one or more pieces of electrical equipment, e.g. in a combination hob also having heater elements such as radiant or halogen elements; and a problem of weakening of the plate: any direct contact between the plate and a through metal element runs the risk of generating cracks in the plate and therefore of weakening it mechanically.

Solutions to these problems have been proposed in the prior art, and in particular the use of various types of metal collar on the perimeters of openings provided through the plate (with the plate not being bent in this context: i.e. with the plate being kept plane). Thus, patent application EP-A-0 715 125 discloses assembling a gas burner in the corresponding opening of a glass-ceramic plate by interposing a metal collar in the form of an eyelet between them, with the collar fitting astride the edge of the opening and thus protecting it mechanically. In addition, sealing is provided by means of a ring-shaped graphite part positioned at the interface between the plate and the metal collar. Although such a system is satisfactory concerning mechanical strength and sealing, it is complex to assemble and cannot be disassembled by the user. In addition, the plate cannot be cleaned completely since the edge of the opening is covered. Finally, the metal collar is relatively expensive, in particular because it is made up of a plurality of parts made by stamping, and because it also makes use of a plurality of additional gaskets or spacers, thereby giving rise to non-negligible extra cost for the cooking apparatus as a whole.

Proposals have also made to bend upwards the perimeters of the openings. The slope thus established around the opening makes it possible to prevent liquids infiltrating beneath the plate, with the liquids flowing down the slope. Openings with perimeters bent in this way—said perimeter being in particular substantially in the form of a truncated cone—are disclosed in patent U.S. Pat. No. 5,549,100. The method implemented for performing that bending is not described in detail. It makes use of a vacuum during the cycle in which the glass is cerammed. In as yet unpublished patent application FR 97/06114, the Applicant has described glass-ceramic plates with at least one opening at the top of a local bending in the plate; at least a portion of the perimeter of said opening being shaped mechanically. The perimeter of the opening is bent during the ceramming cycle and the mechanical shaping of said perimeter advantageously takes place prior to said ceramming cycle.

Finally, patent application FR-A-2 726 350 discloses glass-ceramic plates including at least one fold having a radius of curvature of less than 5 cm. Said fold is made in the glass-ceramic precursor plate and said plate is subsequently cerammed in the folded state.

At this point, it may be observed that glass plates are commonly subjected to local bendings, in particular for the purpose of preparing windscreens and windows for motor vehicles. Such bending is obtained by the mechanical action of an appropriate tool on the plate while the plate is brought to a temperature that is sufficient for its viscosity to present a value that is compatible with the desired bending (in general, a viscosity of the order of $10^{7.6}$ poises is sought). Such a method cannot be transposed in the context of glass-ceramic plates insofar as heating the glass-ceramic precursor plate inevitably initiates and disturbs the ceramming cycle of said plate.

With reference to the problems explained above specific to plates having openings, in a first aspect, the present invention proposes a method of bending the perimeters of openings in a glass-ceramic precursor plate (local bending seeking to raise said perimeter), which method is of the type described in application FR-A-2 726 350. Surprisingly, the Applicant has found that the "folding" method of FR-A-2 726 350 can be adapted to bending the perimeter of an opening that describes a closed curve without sharp angles. This is really surprising insofar as the person skilled in the art would have expected to be faced with problems of breakage, of weakening of the glass plate constituting a precursor and/or of the resulting glass-ceramic plate, given the high levels of tension generated in the bent area.

SUMMARY OF THE INVENTION

Said method of the invention—a method of bending the perimeter of at least one opening formed through a glass-ceramic precursor plate, said perimeter describing a closed curve without sharp angles—comprises:

preheating the plate pierced by at least said opening to a temperature lower than the nucleation temperature of the glass;

quickly heating the area to be bent—the perimeter area of said opening—until the viscosity of the precursor glass in said area reaches a value suitable for bending; the duration of said heating being short enough to avoid causing significant nucleation of the glass in said area;

bending said heated area under the action of at least one tool; and optionally, reheating the thus locally-bent plate to a temperature lower than the nucleation temperature.

BRIEF DESCRIPTION OF THE DRAWINGS

In the accompanying drawings.

Figure 1:
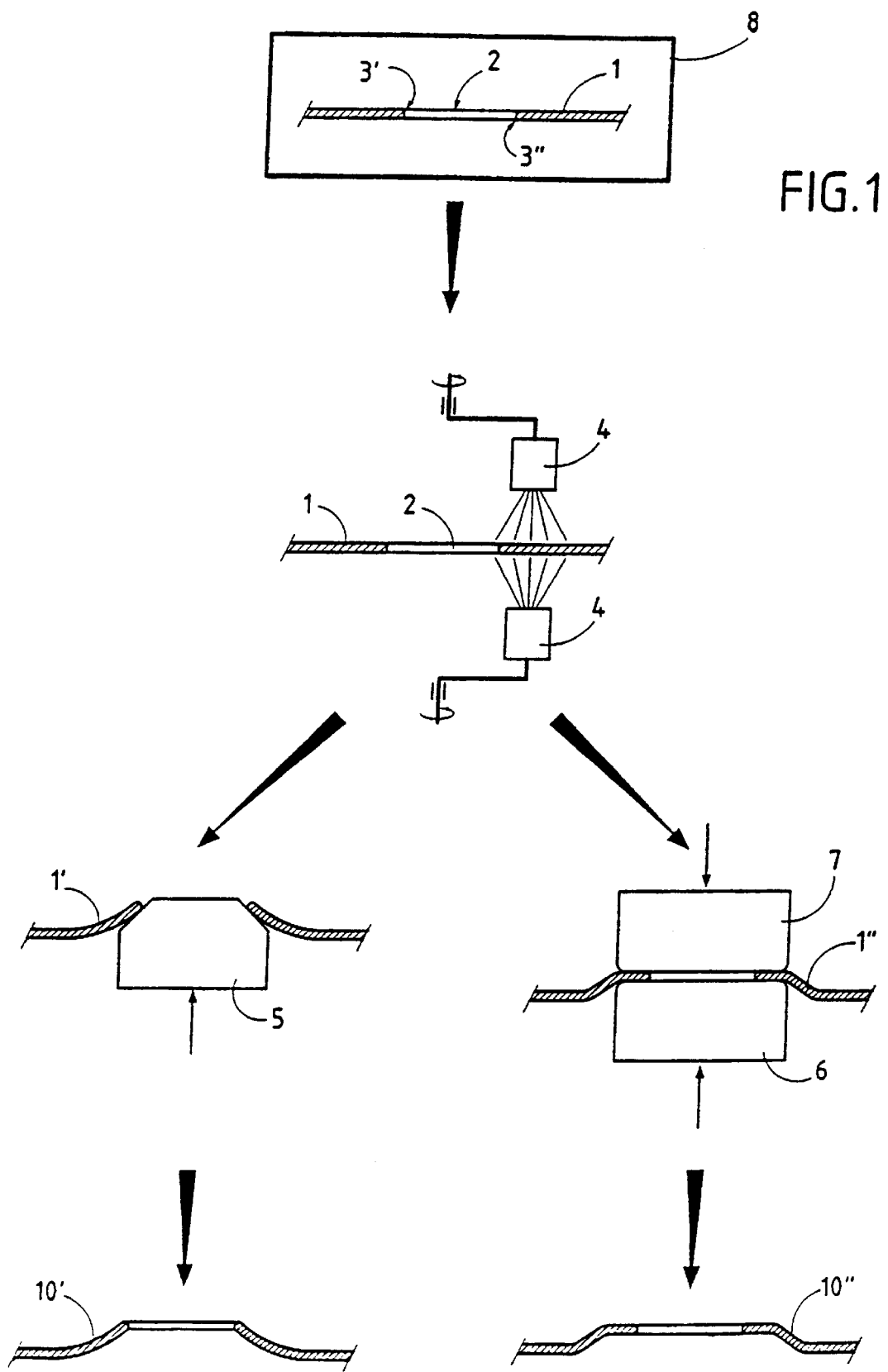
FIG. 1 is a schematic illustration of the method of the invention.

The context of said method is specified here, before examining is greater detail each of the above-listed steps that constitute the said method.

Thus, the invention seeks to bend the perimeter of one or more openings provided in a glass-ceramic precursor plate, said perimeter describing a closed curve without sharp angles. Naturally, in order to solve in particular the problem of sealing described in the introduction of the present specification, the bending takes place upwards. It seeks to raise the perimeter of an opening relative to the plane of the plate. Raising is relative to the position occupied by the plate in use, however the person skilled in the art will understand while the method is being performed, the bending need not take place upwards and can equally well cause a bendable area to move downwards, in the event of the tool acting on an upside-down plate.

Said bending can exist in various shapes. The method of the invention can be used to obtain conventional shapes (the bent portion being in the form of a truncated cone, for example), or shapes that are entirely original. For this purpose, the method of the invention is particularly advantageous. It is equally possible to obtain novel shapes and conventional shapes having original geometrical characteristics. This is developed in detail below.

In a manner that is characteristic of the method of the invention, said bending is implemented on the glass-ceramic precursor plate before the plate is subjected to the ceramming cycle. The plate, which is plane at least in its portion containing the opening(s)—it being understood that the method of the invention can be implemented on plates that have other bendings elsewhere, in particular at least one fold—is made of a glass that is a glass-ceramic precursor, i.e. the raw material for the method of the invention, and it can be constituted by any glass-ceramic precursor that is suitable for the application intended for the final glass-ceramic bored plate. When the final glass-ceramic plate is intended to be used in making cooking hobs, it is the usual practice to use a lithium alumino-silicate glass-ceramic precursor plate. This kind of glass is well known and is described, for example, in FR-A-2 657 079, FR-A-2 612 510, and EP-A-0 220 333. The invention is described herein more particularly with reference to the technical field of hob plates, and to the problem that stems from the presence of openings through them (to pass through burners, control knobs, or any other device), it is however clear that the invention is not restricted to said field. The solution proposed is appropriate for bending for any purpose the perimeter of an opening provided for any purpose through a glass-ceramic precursor plate, in order to obtain the corresponding, bent glass-ceramic plate.

The shape of the opening whose perimeter the invention seeks to bend is described below. In general the opening is circular in section, but that is not essential in any way. Said section can be elliptical, oval, or arbitrary. In any event, the perimeter of the opening is described by a closed curve without any sharp or brittle angles.

Said opening is generally obtained by milling or by cutting out using a jet of water, occupies the thickness of the plane glass-ceramic precursor plate, and presents two projecting edges. In the invention, said plate can be bent directly while in the raw state with the projecting edges around the opening, or after said edges have been shaped mechanically. In an advantageous variant of the method of the invention, said plate is bent in the raw state, and while it is being bent, said projecting edges are shaped thermally, so that after ceramming, an entirely original bent plate is obtained. This is explained in greater detail below.

It may also be mentioned at this point that the glass-ceramic precursor plate processed by the method of the invention can be a plate that is enamelled over all or part of its surface.

Each of the steps in the method of the invention is described in detail below, which method is implemented on a plane glass-ceramic precursor plate, the plate including at least one opening (or hole) whose perimeter describes a closed curve without sharp angles (with the edges of said hole projecting (in the raw state) or being mechanically shaped (ground)).

Initially, the pierced glass plate is preheated to a temperature lower than the nucleation temperature of the glass. Said preheating is generally performed in an oven. It is recommended to implement the preheating to a temperature that is at least 10° C. and preferably at least 20° C. lower than said nucleation temperature. For lithium alumino-silicate glass-ceramic precursors with a nucleation temperature around 700° C., suitable preferred preheating temperatures lie in the range about 550° C. to 680° C. It is usually preferable to maintain the precursor glass at the maximum preheating temperature for a certain length of time, e.g. 10 minutes to 30 minutes, in order to obtain a uniform temperature within the plate. Without initiating ceramming within the glass plate, said preheating seeks to prepare it for the thermal shock to which it is going to be subjected during the second step of the method; which second step consists in intense, quick, and localized heating.

Said heating of the second step—which heating is localized, being limited to the area which is to be bent (the perimeter area of the opening being processed); which intense heating is for the purpose of significantly increasing the viscosity of the glass in said area in a minimum length of time—must be performed very quickly so that no significant nucleation takes place while the glass is at temperatures higher than its nucleation temperature, i.e. the amount of nucleation must not be sufficient to give rise to anarchic crystallization that produces visible and other defects. With lithium alumino-silicate glass-ceramic precursors, where the usual nucleation time is about 15 minutes, it has been found that heating for a duration that does not exceed 1 minute, and preferably does not exceed 30 seconds, does not produce harmful effects. It is strongly recommended that said quick heating should be implemented for a time in the range 5 seconds to 20 seconds.

The quick heating should bring the area of the plate that is to be bent to a temperature that is high enough for the viscosity of the glass to lend itself to said bending. It is believed that this temperature lies in the range 1000° C. to 1500° C. However since it is difficult to measure the temperature of the heated area of the plate during heating that is so quick, temperature is not normally measured, and it suffices to measure the heating time after routine prior tests have been performed to determine the length of heating time necessary for it to be possible to bend said plate easily under given operating conditions.

To implement quick heating, use can be made in particular of powerful heater devices such as gas burners burning oxygen and natural gas or oxygen and hydrogen. In an implementation variant, said quick heating consists in using one or two ring burners. In another variant, which is advantageous, the quick heating makes use of at least one burner that is movably mounted, having a movement that enables it to cover the entire area that is to be bent. Said burner travels over said area n times. It is also possible to have x burners which travel n times over one $x^{th}$ of said area. Surprisingly, it has been observed that in order to obtain the effect sought after, it is not essential for said burner (or several burners) to cover continuously all of said area that is to be bent. In this advantageous variant, it is possible to use at least two burners that are movably mounted on each side of the plane of said plate; the travel of the burner(s) disposed on each side of said plate serving to cover the entire area that is to be bent.

In particularly preferred manner, two burners are used disposed respectively one above and the other below the plate; said two burners are moved together in synchronous manner so as to heat simultaneously the same portions (top face and bottom face) of the perimeter of the opening being processed. Assuming that the opening is circular, said two burners are advantageously secured to a single rotary shaft centered on the opening by arms of the same length L (where L is slightly greater than half the diameter of the opening).

In general, said quick heating is implemented around the outline of the opening over a width of about 5 mm to 60 mm from said outline, on the top and/or bottom face of the glass-ceramic precursor plate. Advantageously, the heating is applied to a raw plate (the edges of the opening not having received mechanical shaping) such that in addition to softening the horizontal portion (of the heated plate) around the opening, it shapes the edges of said opening. Such thermal shaping confers a particularly attractive fire-polished appearance to said edges which is quite different from the ground-glass appearance that is obtained after mechanical shaping. This fire-polished appearance is retained on the glass-ceramic plate obtained by ceramming the glass plate that has been bent by the invention. It will be understood that a small offset in the spacing of the burner(s) used determines whether or not such thermal shaping is applied to the edges of the processed opening.

The person skilled in the art will already have understood the great advantage of this implementation variant of the method of the invention, whereby the quick heating implemented on the perimeter of the opening(s) having projecting edges serves simultaneously to bend said perimeter and to apply thermal shaping to said edges.

The perimeter area of the opening, as raised in this way to a temperature that is sufficient to modify its physical state (it is softened) can then be bent. Bending is performed by using at least one tool. Various types of tool can be used. Generally, the bending is implemented using a stamp-type tool that can be displaced along a vertical axis relative to the opening. A single tool can thus act from one side of the plate that has been heated to an appropriate temperature to bend the perimeter of the opening upwards or downwards. It is also possible to use at least two tools of the stamp type, that are movable along a vertical axis and that are disposed on each side of the plane of the plate, at the level of the opening. These two tools act one after the other to exert vertical pressure in opposite directions. Thus, the first tool may raise the perimeter of an opening and the second tool can then act in turn to bend the raised portion. Similarly, a first tool can lower the perimeter of an opening and the second tool can then act in turn to bend the portion that has been lowered. Advantageously, said second tool acts to flatten the free end of the previously raised or lowered portion. The combined action of two tools disposed on each side of the plane of the plate thus makes it possible to create original bending including a point of inflection. Such bending has not been obtained in the prior art.

In principle, the bending of the perimeter of an opening that has been heated to an appropriate temperature is thus implemented using a stamp-type tool disposed on one side of the plate or with two stamp type tools disposed on both sides of the plate. Naturally, the operative section of such a tool is matched appropriately, being of an area greater than that of the opening whose perimeter is to be bent, and generally slightly greater insofar as the bending is, in principle, not applied to a large width (assuming that the tools are solid).

It may be observed at this point that it is not impossible, at least on one of the two sides of the plate, to use a tool that is asymmetrical, or indeed at least two tools in order to generate a bending that is "complex". . .

Assuming that the perimeter of a circular section opening having a diameter d is to be bent, it is advantageous for the bending tool to be at least one cylinder of diameter D where D>d, with the tool being movably mounted on the axis of said opening, either above or below said plate.

After the tool(s) used has/have been withdrawn, the desired bending is obtained for the perimeter of the opening—which perimeter describes a closed curve without sharp angles—formed in a glass-ceramic precursor plate. It may be observed at this point that the bending can be implemented on this way on a single opening in a plate, on each of the openings in a plate in succession, or simultaneously on all of the openings in a plate. Appropriate apparatus is provided for these purposes.

The glass-ceramic precursor plate, once bent locally in this way, can then be annealed, as mentioned above (naturally at a temperature that is lower than its nucleation temperature), and can then be stored after being cooled, generally while waiting for subsequent ceramming. It can also be "cerammed" directly, i.e. it can be subjected directly to a conventional ceramming cycle.

In a second aspect, the present invention thus provides a method of manufacturing a glass-ceramic plate in which at least one opening is provided, the perimeter of the opening describing a closed curve without sharp or brittle angles of which is bent. Said method comprises implementing bending of said perimeter by means of the above-described method (bending implemented in the glass-ceramic precursor plate, which plate is intended to give rise to the desired glass-ceramic plate), followed by ceramming the plate bent in this way.

In characteristic manner, in the present invention, the bending is obtained prior to ceramming.

Such ceramming is implemented as in the prior art. Mention is often made of a ceramming cycle, well known to the person skilled in the art. Such a cycle may comprise the following steps:

a) raising the temperature of the glass plate at a rate of 10° C./min to 100° C./min to the range in which the glass nucleates;

b) passing through the glass nucleation range over a period of time generally lying in the range 10 minutes to 1 hour;

c) raising the temperature to the ceramming temperature, generally in 10 minutes to 1 hour;

d) maintaining the ceramming temperature generally for 15 minutes to 1 hour; and e) quickly cooling the glass-ceramic plate to ambient temperature.

According to the invention, a particularly effective method is thus provided for preparing a glass-ceramic plate having at least one opening on the surface thereof, the perimeter of which opening, describing a closed curve without sharp angles, is bent (generally raised).

Such plates can be of the type obtained by the method described briefly in U.S. Pat. No. 5,549,100 or by the method of FR 97/06114. The plates may also be novel, having characteristics that are entirely original. In a final aspect, the present invention consists in such novel glass-ceramic plates, per se.

Said plates can have one or more original characteristics. Various implementations of the method of the invention as described in detail above make it possible to prepare:

firstly, a plate that is original concerning the appearance of the rim of the bent perimeter of an opening;

secondly, a plate that is original in the shape of the bending generated around said opening; and thirdly, a plate that is original by the narrow width over which said bending extends.

Concerning appearance, this naturally refers to the fire-polished appearance that can be obtained when the quick heating is implemented on the raw edges of the opening. The description above emphasizes this advantageous variant in the implementation of said quick heating. In addition to said fire-polished appearance, which is in itself advantageous, this technique also confers greater mechanical strength to the bent rim of the perimeter of the opening. In this advantageous variant of the invention, a solution is thus provided to two of the technical problems raised in the introduction of the present text (the problem of sealing, and the problem of plate manufacture). This solution is particularly advantageous. The invention thus also provides a glass-ceramic plate in which at least one opening is provided, and in which the perimeter which describes a closed curve without sharp angles is bent; such a plate is characterized in that the bent rim of said perimeter is of fire-polished appearance. This fire-polished appearance, which can also be referred to as fire-polishing (where fire-polishing is a technique that is well known in glassmaking) is, as mentioned above, the result of heat shaping and is quite unlike the ground-glass appearance that can result from implementing mechanical shaping.

Concerning shape, particular novel glass-ceramic plates are those in which at least one opening is provided, the perimeter, of which describing a closed curve without sharp angles, is bent, said bending of said perimeter having a point of inflection. As shown above, such bending can be the result of successive action by two tools situated on each sides of the plane of the plate. Such a point of inflection serves advantageously to bring the bent rim of said perimeter—the rim which is raised when the plate is in its position of use—into a substantially horizontal plane. This type of shape is particularly advantageous for positioning a gas burner in a stable manner and with good sealing.

Concerning the width of the bending that is generated, the invention makes it possible to bend the perimeters of openings over a wide range of bending widths, and in particular widths that are less than or equal to 60 mm (generally widths lying in the range 5 mm to 40 mm). Surprisingly, the Applicant has been able to obtain bending that is advantageous in terms of height over record (very narrow) widths. The person skilled in the art is well aware how advantageous it is to confine the bending area, particularly if it is desired to have a plurality of burners coexisting relatively close together in the same plate. Thus, the invention also provides an original glass-ceramic plate in which at least one opening is provided, the perimeter of which describing a closed curve without sharp angles, is bent; such a plate being characterized in that said bending extends over a width that is less than or equal to 30 mm, and in particular over a width lying in the range 5 mm to 30 mm.

The plates of the invention thus present at least one of the three original characteristics described above. The plates of the invention can perfectly well present at least two of said three characteristics in combination, or indeed all three of them.

The invention, in both its method and its product aspects is now described below with reference to the accompanying figures.

FIG. 1 shows the methods of the invention: the method of bending the perimeter of at least one opening provided in a glass-ceramic precursor plate (said perimeter describing a closed curve without sharp or brittle angles), and the method of ceramming said bent plate. The figure shows how two different types of bending are made.

Figure 2:
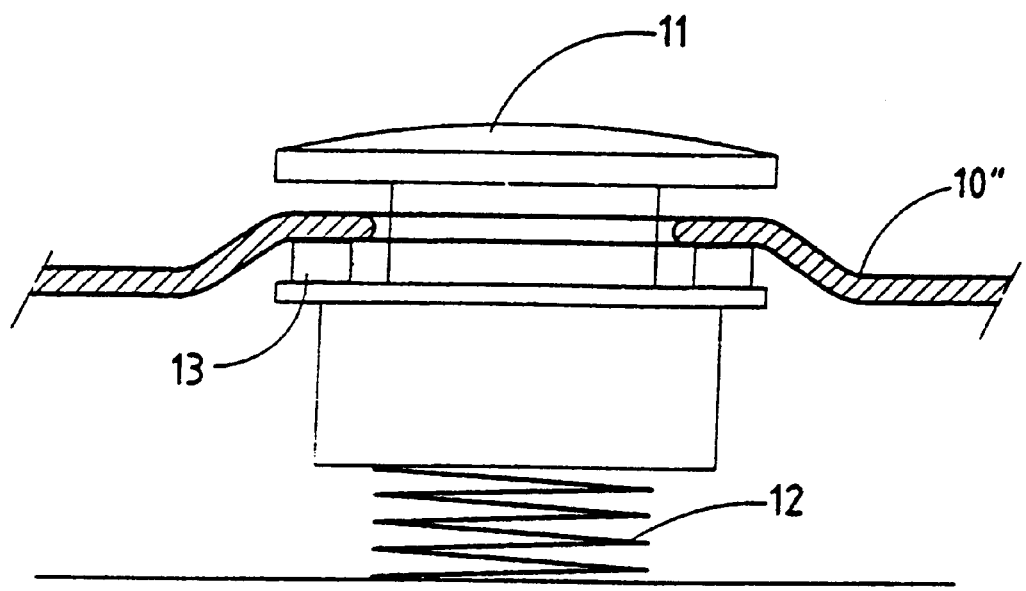
FIG. 2 is a schematic illustration of a gas burner mounted in a glass-ceramic plate bent in accordance with the invention.

FIG. 2 is a section through the system for fixing a gas burner to a glass-ceramic plate that has been bent by the invention.

FIG. 1 should be viewed as a flow sheet. It shows various steps in the methods of the invention.

In the first step, a plate 1 made of a glass that is a glass-ceramic precursor and that is pierced by an opening 2 of circular section is preheated in an oven 8. Said plate 1 is a raw glass plate, i.e. the top and bottom edges 3' and 3" of said opening 2 project. They have not been shaped mechanically.

In the second step, the perimeter of said opening 2 is heated quickly over a width 1, by means of two burners 4 that are mounted to rotate on each sides of the plane of said plate 1. Said burners 4 are disposed so that they thermally shape the projecting top and bottom edges 3' and 3" of said circular opening 2. Said burners 4 do not heat the area which is to be bent continuously. Although said burners 4 are shown, mounted in identical manner, that is not essential.

In the third step, said perimeter is bent once it has been raised to an appropriate temperature. Two different ways of implementing such bending are shown diagrammatically. On the left, the perimeter of the opening 2 is raised by a single stamp 5. On the right, the perimeter of the opening 2 is bent in two stages, under the action of two stamps 6 and 7.

Then, in a fourth step, the resulting bent plate 1' or 1" is subjected to a ceramming cycle. The ceramic plate 10' is of conventional shape but is nevertheless original in the fire-polished appearance of the edges of its bent opening 2, while the ceramic plate 10" not only has a fire-polished appearance for the edges of its opening, but also has a shape that is completely original and most advantageous. The bending of said plate 10" includes a point of inflection, and it terminates in a raised and substantially horizontal plane.

The advantage of this type of bending will be better understood on referring to FIG. 2.

A burner 11 has been mounted in the bent-perimeter opening 2 of the cerammed plate 10". Said burner 11 is shown diagrammatically as being mounted on a spring 12. Gaskets are referenced 13. Said spring 12 urges said burner 11 into said opening 2 having edges of fire-polished appearance.

Finally, the invention is illustrated by the following Example.

The openings in glass-ceramic precursor plates were bent in accordance with the invention; said plates were 4 mm thick and each of them had four circular openings of 60 mm diameter.

Said glass, a glass-ceramic precursor, had the following composition in percentage by weight based on the oxides:

| | |
|---|---|
| $SiO_2$ | 68.25 |
| $Al_2O_3$ | 19.2 |
| $Li_2O$ | 3.5 |
| MgO | 1.2 |
| ZnO | 1.6 |
| BaO | 0.8 |
| $TiO_2$ | 2.6 |
| $ZrO_2$ | 1.7 |
| $As_2O_3$ | 0.6 |
| $Na2O + K_2O$ | 0.35 |
| $V_2O_5$ | 0.2 |

Each plate was placed in an oven. The oven was then raised to a temperature of 650° C. This rise in temperature took 20 min. Said oven containing said plate was then stabilized at said temperature of 650° C. for 10 minutes.

The plate, preheated in this way took 3 seconds to be transferred to the bending station. In said station, there were two gas burners for each opening: the burners were oxygen and natural gas burners and they were disposed on each sides of the plane of the plate, as shown diagrammatically in FIG. 1. Said burners were put into operation 1 second later and they comprised:

bottom round burners having a diameter of 34 mm; and top round burners having a diameter of 23 mm.

The quick heating of the area to be bent lasted for 8 seconds for the top burners and 6 seconds for the bottom burners. The rates at which said burners were fed are given in the table below.

| Top burners | | Bottom burners | |
|---|---|---|---|
| Oxygen flow rate ($Nm^3/h$) | Natural gas flow rate ($Nm^3/h$) | Oxygen flow rate ($Nm^3/h$) | Natural gas flow rate ($Nm^3/h$) |
| 1.5 | 0.8 | 1.9 | 1.0 |

Said top and bottom burners were rotated at 60 revolutions per minute (rpm).

At the end of said quick heating, stamping tools of the kind shown diagrammatically at 5 in FIG. 1 acted on the underside of each of the four openings. Said tools exerted their action for 2 seconds.

The plates bent in this way were then transferred directly to another station to be subjected to conventional ceramming processing.

Depending on the adjustments of the stamping tools and on the positions of the burners (distance from the axes of the openings in the plates), the perimeters of the openings were bent in the manners specified in the following table by their widths and their heights:

| Width of bending (mm) | Height of bending (mm) |
|---|---|
| 20 | 3 |
| 11 | 3 |
| 8 | 3 |
| 23 | 15 |
| 13 | 14 |

What is claimed is:

1. A method of producing a glass-ceramic plate having at least one opening through the plate, the method comprising, providing a precursor glass plate having at least one opening through the plate with a perimeter describing a closed curve free of sharp angles, preheating the plate having at least one opening to a temperature below the nucleation temperature of the glass, further heating an area of the plate around the perimeter of the opening to a temperature at which the viscosity of the area is at a value adapted to bending, and for a time insufficient to cause significant nucleation of the glass in the heated area, and applying at least one tool to mechanically bend the further heated perimeter area ceramming the bent plate.

2. The method according to claim 1 which further comprises annealing the bent glass article at a temperature below the nucleation temperature of the glass.

3. The method according to claim 1 which comprises preheating the glass plate to a temperature at least 10° C. below the nucleation temperature of the glass.

4. The method according to claim 1 which comprises providing a lithium aluminosilicate, precursor glass plate have a nucleation temperature of at least 700° C. and preheating the glass plate to a temperature in the range of 550–680° C.

5. The method according to claim 4 which comprises maintaining the preheated area of the plate at maximum temperature for 10–30 minutes.

6. The method according to claim 1 which comprises further heating an area around the perimeter of the opening for a time not exceeding 1 minute.

7. The method according to claim 6 which comprises further heating the area around the perimeter of the opening for a time of about 5 to 20 seconds.

8. The method according to claim 6 which comprises heating the area around the perimeter of the opening with at least one movable mounted burner whose movement covers all of the area that is to be bent.

9. The method according to claim 8 which comprises heating the area with at least two movable mounted burners mounted on either side of the plane of said plate, the movement of said burner(s) disposed on each side of said plate covering all of the area that is to be bent.

10. The method according to claim 6 which comprises heating the area to be bent in a manner that thermally shapes the edges of opening to provide the edges with a fire-polished appearance.

11. The method according to claim 1 which comprises applying at least one stamp-type tool and moving that tool along a vertical axis at the level of said opening to bend the heated area.

12. The method according to claim 1 which comprises applying at least two stamp-type tools, disposing the tools on each side of the plane of said plate at the level of said opening, and moving the tool along a vertical axis to bend the glass.

13. The method according to claim 1 which comprises bending a perimeter of a circular section opening of diameter d with at least one movable mounted cylinder, of diameter D, where D>d, and moving the cylinder along the axis of said opening with respect to plate.

14. A method of manufacturing a glass-ceramic plate which comprises at least one opening whose perimeter describes a closed curve free of sharp angles, the method comprising:

providing a plate of a precursor glass for a glass-ceramic, forming an opening through the glass plate, heating an area around the perimeter of opening to a temperature at which the viscosity is at a value adapted to bending, mechanically bending the heated area of plate around the perimeter of opening, and ceramming the bent plate.

* * * * *